United States Patent [19]

Young

[11] Patent Number: 5,696,949

[45] Date of Patent: Dec. 9, 1997

[54] SYSTEM FOR PCI SLOTS EXPANSION USING ASYNCHRONOUS PCI-TO-PCI BRIDGE WITH CLOCK GENERATOR FOR PROVIDING CLOCK SIGNAL TO THE EXPANSION MOTHER BOARD AND EXPANSION SIDE OF BRIDGE

[75] Inventor: Bruce Young, Tigard, Oreg.

[73] Assignee: Intel Corporation, Santa Clara, Calif.

[21] Appl. No.: 490,778

[22] Filed: Jun. 15, 1995

[51] Int. Cl.[6] .................. G06F 13/40; G06F 1/04
[52] U.S. Cl. .................... 395/551; 395/200.78
[58] Field of Search ...................... 364/200, 900; 395/181, 280, 281, 325, 842, 551, 200.78

[56] References Cited

U.S. PATENT DOCUMENTS

| | | | |
|---|---|---|---|
| 4,413,319 | 11/1983 | Schultz et al. | 364/200 |
| 4,882,702 | 11/1989 | Struger et al. | 364/900 |
| 5,191,657 | 3/1993 | Ludwig et al. | 395/325 |
| 5,335,329 | 8/1994 | Cox et al. | 395/325 |
| 5,495,569 | 2/1996 | Kotzur | 395/181 |
| 5,542,055 | 7/1996 | Amini et al. | 395/281 |
| 5,548,730 | 8/1996 | Young et al. | 395/280 |
| 5,590,377 | 12/1996 | Smith | 395/842 |

OTHER PUBLICATIONS

Shanley, et al., "*PCI-to-PCI Bridge,*" PCI System Architecture Series, Chapter 19, Nov. 1995, pp. 381–387.

*Primary Examiner*—Thomas C. Lee
*Assistant Examiner*—David Ton
*Attorney, Agent, or Firm*—Blakely, Sokoloff, Taylor & Zafman

[57] ABSTRACT

An apparatus and method for providing PCI slot expansion. An asynchronous PCI to PCI bridge for insertion into a host PCI slot is coupled via a cabled PCI bus to an expansion module. The bridge establishes two distinct time domains. An expansion clock signal is generated and its timing matched for consistent arrival throughout the expansion clock domain. An expanded number of PCI slots are thereby available to the host system.

21 Claims, 6 Drawing Sheets

| SIGNALS | PINS | DESCRIPTION |
| --- | --- | --- |
| AD[0:31] | 32 | Standard PCI multiplexed address/data lines |
| C/BE[0:3]# | 4 | Standard PCI multiplexed command/byte enable lines |
| FRAME# | 1 | Standard PCI FRAME# line |
| IRDY# | 1 | Standard PCI IRDY# line |
| TRDY# | 1 | Standard PCI TRDY# line |
| DEVSEL# | 1 | Standard PCI DEVSEL# line |
| STOP# | 1 | Standard PCI STOP# line |
| LOCK# | 1 | Standard PCI LOCK# line |
| PERR# | 1 | Standard PCI PERR# line |
| SERR# | 1 | Standard PCI SERR# line |
| RESET # | 1 | Standard PCI RESET# line |
| PAR | 1 | Standard PCI PAR line |
| REQ# | 1 | *SEB* request to *PEB* for use of the *SEC*. |
| GNT# | 1 | *PEB* grant to *SEB* use of the *SEC*. |
| SINT# | 1 | Serialized interrupt line (Not Standard PCI) |
| CLK | 1 | *SEB* generated clock to *PEB* for use of the with the interface to *SEC*. |
| total | 50 | |

*FIGURE 1A*

| Option | Clock Period | Total Buffer Skew | Delay Line | | Cable | |
|---|---|---|---|---|---|---|
| | | | Delay | Skew | Length | Skew |
| 1 | 30ns | 840ps | 10ns | 250ps | 10ns | 910ps |
| 2 | 40ns | 10840ps | 10ns | 250ps | 10ns | 910ps |
| 3 | 40ns | 1500ps | 19ns | 250ps | 19ns | 1250ps |
| 4 | 50ns | 20840ps | 10ns | 250ps | 10ns | 910ps |
| 5 | 50ns | 11500ps | 19ns | 250ps | 19ns | 1250ps |
| 6 | 60ns | 21500ps | 19ns | 250ps | 19ns | 2150ps |

*FIGURE 4: Clock Skew*

| | 33 MHz | 25 MHz |
|---|---|---|
| Clock Skew (PCI) | 2 ns | 6 ns |
| Clock to Out at Master (PCI) | 11 ns | 11 ns |
| Cable delay at 6 feet +/- 2 in. | 9.5 ns | 9.5 ns |
| Cable Skew | 0.5 ns | 0.5 ns |
| Setup at Target (PCI) | 7 ns | 7 ns |
| Margin | 0 ns | 6 ns |
| Total Period | 30 ns | 40 ns |

*FIGURE 4A*

SYSTEM FOR PCI SLOTS EXPANSION USING ASYNCHRONOUS PCI-TO-PCI BRIDGE WITH CLOCK GENERATOR FOR PROVIDING CLOCK SIGNAL TO THE EXPANSION MOTHER BOARD AND EXPANSION SIDE OF BRIDGE

BACKGROUND OF THE INVENTION

1. Field of the Invention

The invention relates to bussing in a computer system. More specifically, the invention relates to using PCI as a cable bus to expand the number of PCI slots available in a system.

2. Related Art

The peripheral component interconnect (PCI) bus is a high performance low latency I/O bus architected to minimize system cost. PCI has quickly gained wide acceptance in the computer industry. The PCI bus standard provides for a high bandwidth and a flexibility that is independent of new processor technologies and increased processor speed. At this time, computer system architects are primarily designing speed sensitive peripherals such as graphics accelerators and SCSI disk drive controllers to be utilized with the PCI bus.

The PCI specification is well defined. See particularly, PCI Local Bus Specification, rev. 2.0, Apr. 30, 1993. The specification reflects that PCI is capable of running at any frequency up to 33 MHz. This high level of possible throughput makes PCI an ideal choice for volume servers. Unfortunately, at such speed, the PCI bus can only support 3-4 slots along a single bus segment. This number of slots is unacceptably low for a practical application in the volume server market. Some prior systems have addressed this problem by cascading PCI buses on the host mother board. Unfortunately, such cascading increases the cost of the basic system and still fails to provide a level of slot expansion necessary in volume servers. Moreover, such single chassis systems are not readily expandable as the user's needs change.

The possibility of bussing between multiple modular chassis implicates some unique problem in the context of PCI. Specifically, using available PCI to PCI bridges, it is necessary to synchronize the clock system wide. Because PCI does not require a standard host clock signal, phase lock loops cannot be employed to synchronize both sides of the bridge. The shear physical dimension of a multi-chassis system makes such synchronization of a single clock domain even more problematic. These problems necessitated custom design for circuits to provide out of chassis slot expansion.

Additionally, the PCI bus specification requires four active low, level sensitive interrupt pins for all slots supported and defines these interrupts use as hardware shareable. That means that multiple PCI devices can drive the same interrupt line or that multiple PCI interrupt lines can be driven by different devices but may result in a single interrupt being generated to the system interrupt controller to be serviced by a shared interrupt driver. Thus, as the number of slots amongst which the interrupts must be shared increases, the resources and overhead required to resolve the source of the interrupt also increases as the number of sharing slots increases.

It is therefore desirable to provide an apparatus which allows PCI slot expansion without unnecessarily increasing the cost of the host system. Such apparatus should be forward and backward compatible, without requiting customization to each specific system. The performance of an expanded slot must be maintained at an acceptably high level, and the system should be readily expandable to meet the demands of increasing processor power. It is also desirable to develop a way to simplify the interrupts generated by such an expanded system.

BRIEF DESCRIPTION OF THE DRAWINGS

FIG. 1A is a table of the signals and required pins in the cabled bus of the invention.

FIG. 4 is a table listing specifications of cables suitable for the instant invention.

FIG. 4A is a table showing timing budgets of two possible operating points for the invention.

SUMMARY OF THE INVENTION

The instant invention provides an apparatus and method for expanding the number of PCI slots available to a host system. By employing an asynchronous PCI to PCI bridge, host and expansion time domains are segregated. A cabled PCI bus responsive to a clock signal generated and controlled in the expansion module is used to carry the signals between independent host and expansion chassis. Because the expansion system is not dependent on the host clock or the functionalities of the host system, it is suitable for integration into existing system, and it will not increase the cost of a base host system. Thus, the invention provides ready expandability as needs change.

In one embodiment, the invention provides interrupt expansion in addition to slot expansion. This is accomplished by providing a means for connecting to the host APIC bus on the expansion card and a means of encoding the PCI interrupts generated by the expansion PCI slot into APIC on the expansion mother board. This expansion will reduce the overhead associated with servicing interrupts shared by the expanded slots.

DETAILED DESCRIPTION OF THE INVENTION

The present invention provides a method and apparatus for using a cabled PCI bus to provide an expansion of the number of PCI slots available to a host system. For the purpose of explanation, specific details are set forth to provide a thorough understanding of the present invention. However, it will be understood by one skilled in the art, from reading this disclosure, that the invention may be practiced without these details. Moreover, well known elements devices, process steps and the like are not set forth in order to avoid obscuring the invention.

Figure 1:
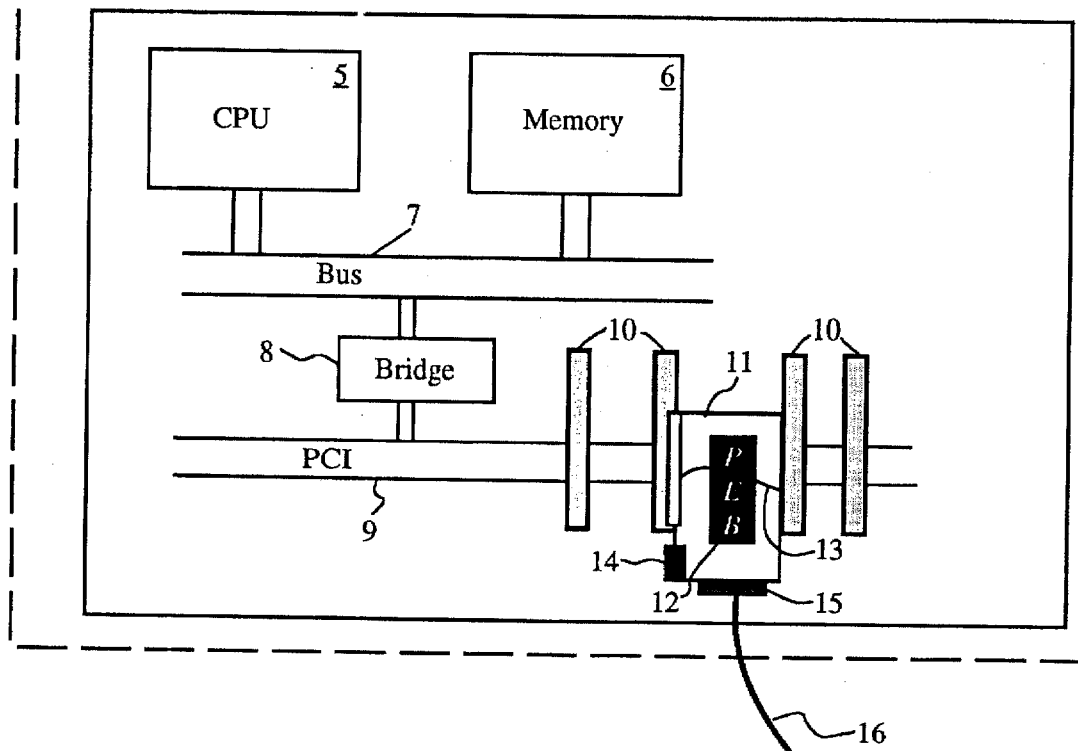
FIG. 1 shoes a block diagram of a host and expansion module of the invention.
Figure 1:
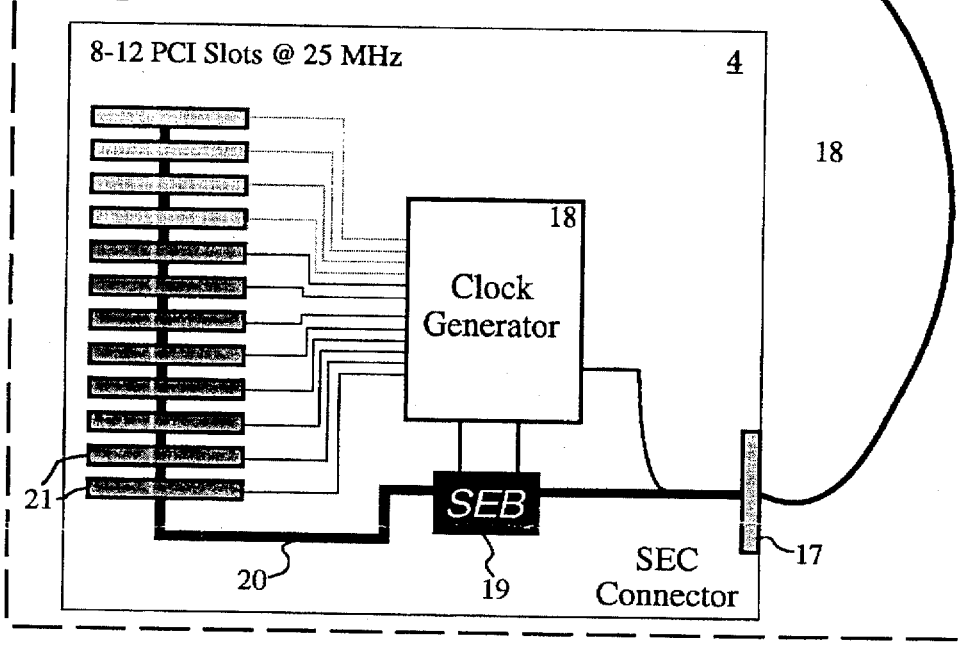

FIG. 1 shows a block diagram of a system incorporating the instant invention. The host system resides within a host chassis 1 and includes a host mother board 3. The host mother board has a CPU 5 connected to a memory 6 by a system bus 7. A bridge 8 is provided on the mother board to bridge between the system bus 7 and a host PCI bus 9. At 33 MHz, the PCI specification only permits 3-4 slots 10 along a single bus segment. By installing an expansion card 11 in at least one of the slots 10 on the host PCI bus 9, it is possible to expand the number of slots of the system as a whole.

The expansion card 11 has a primary expansion bridge (PEB) 12 described more fully with reference to FIG. 2 below, and a cable connector 15, an exemplary embodiment employs a 100 pin cable connector. The expansion card also provides an optional APIC connector 14 to allow the card 11 to be connected to the APIC bus not shown on the host mother board 3. This allows for sufficient signal conductors to accommodate parallel transmission of all PCI required signals and adequate grounding. FIG. 1A is a table of the relevant PCI signals. The cable 16 is selected based on propagation speed down the cable 16 and cable skewing. It is desirable to choose a cable 16 with minimal skewing with maximum propagation speed. The cable 16 functions as a point to point PCI bus between the expansion side of the PEB 12 and the secondary expansion bridge (SEB) 19 which is described more fully below. The cable 16 should be well terminated at either end with impedances approximately equal to the characteristic impedance in the cable. In an exemplary embodiment, a six foot HIPPI cable with a characteristic impedance of 88±5 ohms is used. HIPPI cable meets ANSI standards and includes 50 twisted pairs, thereby providing an adequate number of signal lines. It would be possible to use a smaller cable and lower pin count connector but such would limit possible functionality somewhat.

The expansion chassis 2 contains an expansion mother board 4 to which the cable 16 connects via connector 17. A PCI bus runs from the connector to the SEB 19. The clocking in the expansion system is provided by a clock generator 18 which is asynchronous with and independent of the host clock (not shown). The number of slots 21 available on the secondary PCI bus (SPB) 20 is determined by the speed of the clock signal generated. At 25 MHz, 8–12 slots are available, while at 33 MHz, only 3–4 slots would be available.

It is possible and contemplated as within the scope of this invention that multiple expansion modules could be coupled to a single host (one card per available PCI slot). It is also within the scope of the invention to cascade an expansion module off an expansion module.

Figure 2:
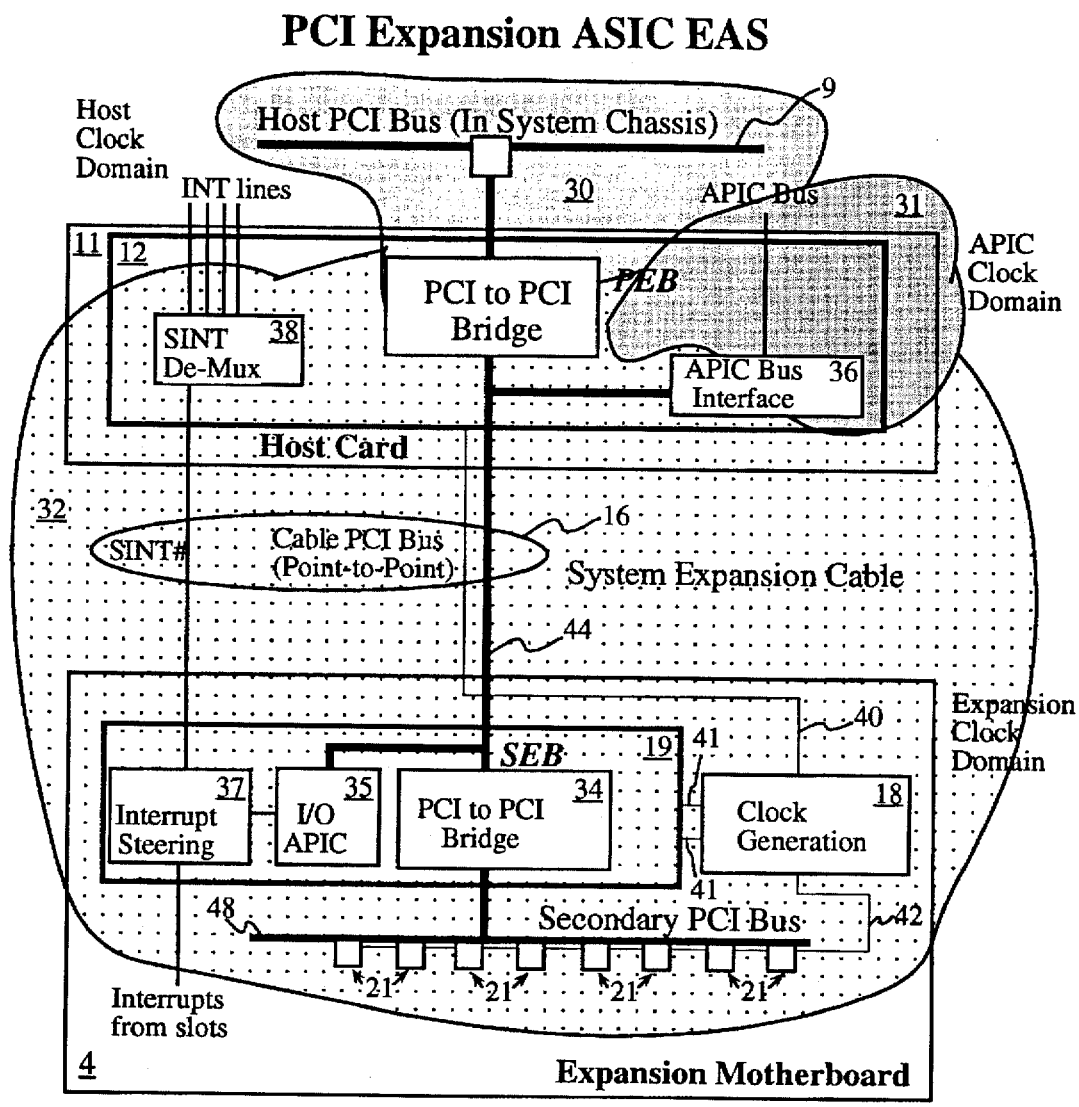
FIG. 2 is a block diagram of the module interfaces of the instant invention.

FIG. 2 more clearly sets forth the relationship between the PEB 12, Cable 16, and SEB 19. FIG. 2 is divided into three clock domains. The host clock domain 30, the expansion clock domain 32, and an optional APIC clock domain 31. The instant invention employs an asynchronous bridge 33 between the host and expansion module. A PCI to PCI bridge comprises a primary bus interface and a secondary bus interface. In the case of an asynchronous bridge the primary interface is responsive to the host clock while the secondary interface is responsive to the expansion clock, thereby creating an asynchronous boundary 13 between the host clock domain 30 and expansion clock domain 32. At the most basic level this could be implemented with a pair of D flip flops for each relevant signal. As a practical matter to ensure data validity where clock rates vary it is desirable to provide some storage between the two interfaces. Inbound and outbound queues of 4×16 bytes have been found adequate. For further detail see PCI to PCI Bridge Spec. Revision 1.0, Apr. 15, 1994.

In one exemplary embodiment, the host PCI bus is connected to an asynchronous PCI to PCI bridge 33 contained in PEB 12 on the expansion card. The host side of the bridge 33 operates in the host clock domain 30 while the expansion side is synchronous with the expansion clock domain 32. The PEB 12 also contains a demultiplexer 38 to demultiplex the 4 PCI supported interrupts coming from the expansion system. An optional APIC bus interface 36 can also be provided within the PEB 12, thereby expanding the interrupts available to the expansion system. Such interface must be asynchronous operating partially in the APIC clock domain 31 and partially in the expansion dock domain 32. Significantly, this option does not comply with the PCI specification. Intelligent I/O units like those described in co-pending application, Architecture for I/O Processor that Integrates a PCI-to-PCI Bridge, Ser. No. 08/490,654 supports these functionalities. Accordingly, one embodiment envisioned in the instant invention employs such an intelligent I/O unit as the PEB 12.

Figure 5:
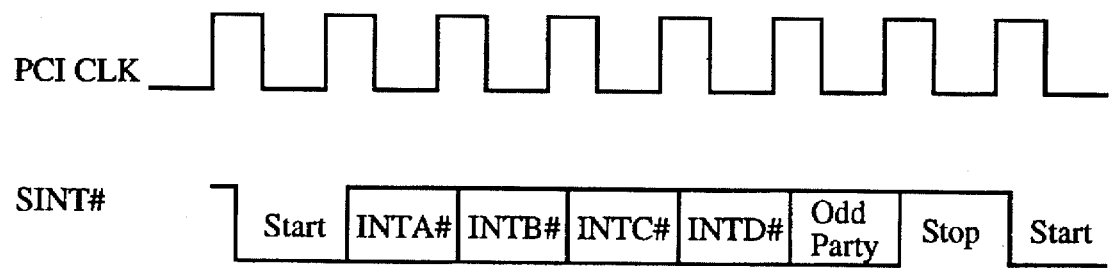
FIG. 5 is a timing diagram of one serialization scheme of PCI interrupts for use in one embodiment of the invention.

The expansion end of the asynchronous bridge 33 is coupled through a cabled PCI bus 16 to the SEB 19 on the expansion mother board 41. The cable 16 contains the PCI bus signals 44, the expansion domain clock signal 40, and SINT# 39. SINT# 39 is not a standard PCI line. Rather, it is a line carrying the serialization of the standard PCI interrupts. One way to serialize this is to continuously synchronize the four standard PCI interrupt signals to the PCI dock and send the information across the interface on SINT# whenever a change occurs using a protocol of one start bit (low), INTA#, INTB#, INTC#, INTD#, odd parity and one stop bit (high) as shown in FIG. 5. If an interrupt is unmasked in the I/O APIC, then that INT#line should not be serialized on the SINT# signal (i.e. it should be interpreted as inactive). In such case, the I/O APE will handle distributing the interrupt to the host. The SINT# protocol will be driven continuously (with all interrupts inactive) during reset. The interrupt serializer will also send a new message after 16 clocks of inactivity.

SINT# is used by the PEB to decode the current value of INTA#, INTB#, INTC#, INTD#. Whenever the interrupt demux block sees SINT# go low, it will capture the data for the next four clocks and if the parity (5th clock after Start) is good, use the data to update its current value for the four interrupt outputs. If bad party is detected, the data will be ignored. This interrupt serialization process causes a worst case delay of 9 clocks for each level of expansion subsystem (2 for synchronization and 7 to send) which is 360 ns at 25 MHz. This is merely one simple way to serialize interrupts. Other serialization schemes will occur to one of ordinary skill in the art, such schemes are contemplated for use with the instant invention.

At the expansion end of cable 16, the SEB 19 contains a PCI to PCI bridge 34 which may be synchronous or asynchronous. SEB 19 also optionally contains an I/O APIC 35 which expands the number of interrupts available for use by the expansion system, and reduces or eliminates the polling which would be required of all PCI slots in the combined host and expansion system shared only the four PCI provided interrupts. Finally, an interrupt steering device 37 is provided to either steer the PCI supported interrupts across the cable 16 to the demultiplexer 38, or if provided, steers slot interrupt into the I/O APIC 35 which in turn buses the interrupt along the cable 16 to the APIC bus interface 36. Again, it is contemplated that an intelligent I/O unit as described in co-pending application Ser. No. 08/490,654 could be used to implement SEB 19. Also, on the expansion mother board 4 are the clock generation device 18 and the secondary PCI bus 45.

In FIG. 2, eight slots 21 are shown on the secondary PCI bus 45. PCI does not define a maximum number of slots, rather it has rigidly defined electrical characteristics. Specifically, PCI defines that clock skew+clock to out at master+setup at target+settling time≦clock period. In the clock generation scheme described below the time allotted for settling is used as flight time down the cable 16 thereby reducing the latency in the transaction between host and expansion modules. Since the introduction of each slot 21 increases the capacitance of the system thereby negatively affecting the transition speed between states, i.e., the settling time, a slower clock increases the time available for settling and accordingly increase the number of loads (slots) the system can handle of operation is at 25 MHz, it is contemplated that 8-12 slots could be provided.

Figure 3:
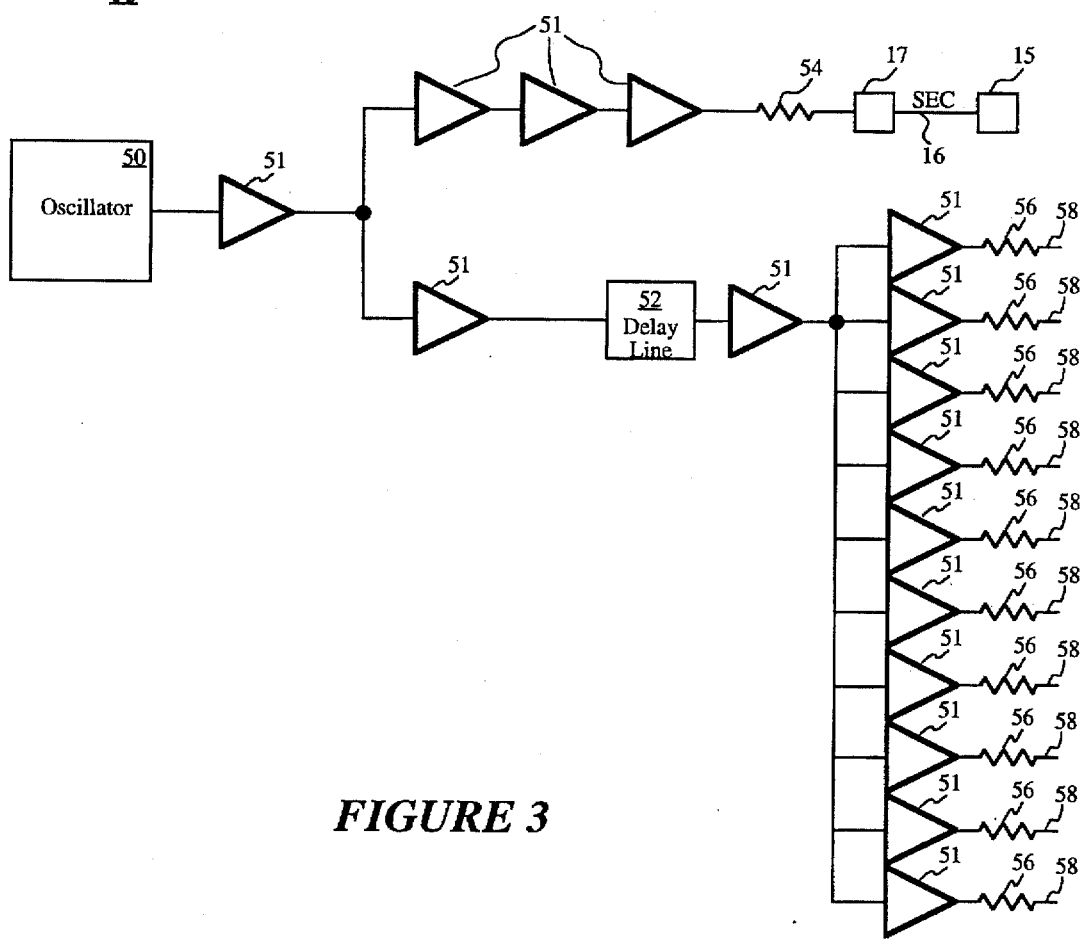
FIG. 3 is a diagram of the clock generation circuit for the expansion module of the invention.

FIG. 3 shows the clock generation of the instant invention, an oscillator 50 generates a clock signal of a desired frequency up to 33 MHz. It will be recognized that an oscillator need not be employed to generate the clock signal, any conventional method of generating a signal of the desired frequency can be employed. In an exemplary embodiment, the oscillator 50 generates a 25 MHz clock signal.

The present application requires multiple copies of the clock be generated from a single source. FIG. 3 shows the clock signal going to the cable 16 and ten other lines 58. This is adequate for right slots 21 and the SEB 19. It is necessary that the clock used at the host interface end of the cable 15 and expansion chassis interfaces 58 arrive within the clock skew timing specifications. To this end, low skew clock drivers 51 are employed along each line to minimize skew along the different lines, and a delay element 52 is introduced between the local lines and the remote interface 15. By matching the propagation delay in the cable 16 to the host (remote) interface 15 with a delay element 52, it is possible to achieve the desired synchronization of the clocks at the respective interfaces 15 and 58. To select an appropriate delay line 52 value two options exist, one can either delay the local lines by the propagation delay in the cable or delay the signal to the cable by the period of its clock signal minus the propagation delay. FIG. 3 depicts the delay element 52 introduced along the local lines. It is contemplated that either a passive delay line or suitable high speed buffer might be employed to accomplish the desired delay. The maximum clock skew between slots 21 on the expansion mother board 4 and the SEB 19 is 2 ns. FIG. 4 reflects possible selections which will satisfy the PCI specifications. Significantly, each clock signal line should be matched as closely as possible. Thus, the same number of buffer drivers 51 are employed along each line. Impedances 56 should be matched with the characteristic impedance of the clock traces on expansion motherboard 4. Moreover, the lengths of printed circuit board traces from the buffers 51 to their destinations should be as closely matched as possible, including the trace from the buffer driving the cable connection. This can be done by increasing the length of all traces to match which ever trace has the longest length naturally. The most critical length match is between the clock going to the SEB 19 and the one driving the PEB 12 through the cable 16. Appropriately selecting delay 52 line value will improve this match.

The electrical connection scheme uses the bridge chips (i.e., PEB and SEB) to connect to the cable using series termination. This termination is external. The series termination value is equal to the impedance of the cable minus the impedance of the driver. The source end of the cable is driving with a ½ voltage incident waveform which doubles to a full voltage waveform due to the reflection coefficient of 1 it encounters at the destination end of the cable. When driving the cable the series termination forms a half wave incident waveform which encounters a reflection coefficient of one. In an embodiment employing a 6 foot cable, the characteristic impedance of such cable is 88±5 ohms. Accordingly appropriate termination impedances can be selected with reference to the impedance of the selected driver.

It would also be possible to place the clock generator 18 on the expansion card 11. While the same rules discussed above would apply to such placement, maintaining the required coordination of the signals becomes more problematic as the number of remote signals to be coordinated increases. Nevertheless, such placement is within the scope and contemplation of the invention.

In the foregoing specification, the invention has been described with reference to specific embodiments thereof. It will however be evident that various modifications and changes may be made thereto without departing from the broader spirit and scope of the invention as set forth in the appended claims. The specification and drawings are accordingly, to be regarded in an illustrative rather than a restrictive sense. Therefore, the scope of the invention should be limited only by the appended claims.

What is claimed is:

1. An apparatus for providing PCI slot expansion comprising:

an expansion card having disposed thereon an asynchronous PCI to PCI bridge with a host side and an expansion side for coupling to a host motherboard;

an expansion motherboard having a plurality of PCI slots;

a cabled PCI bus for coupling the expansion card to the expansion motherboard;

a clock generator for providing a clock signal to the expansion motherboard and the expansion side of the asynchronous PCI to PCI bridge.

2. The apparatus of claim 1 wherein the clock generator is disposed on the expansion mother board.

3. The apparatus of claim 2 wherein the dock generator generates a 25 MHz signal.

4. The apparatus of claim 2 wherein the expansion mother board further comprises a secondary expansion bridge; and coupling the cabled signals to an expansion PCI bus having a plurality of slots.

5. The apparatus of claim 4 wherein the secondary expansion bridge further comprises an interrupt steering circuit and an I/O APIC; and the expansion card further comprises an APIC interface.

6. The apparatus of claim 1 wherein the asynchronous bridge is an intelligent I/O unit.

7. The apparatus of claim 4 wherein the secondary expansion bridge is an intelligent I/O unit.

8. A modular computer system providing an expanded number of PCI slots comprising:

a host module having a host motherboard with a CPU disposed thereon;

a PCI bus disposed on the host motherboard responsive to a host clock and having a plurality of host PCI slots;

an expansion card for coupling to one of the plurality of host PCI slots;

an expansion module having an expansion motherboard, the expansion motherboard having an expansion PCI bus with a plurality of expansion PCI slots responsive to an expansion clock signal; and a cabled PCI bus for connecting the host and expansion modules.

9. The modular computer system of claim 8 further comprising a primary expansion bridge for providing an interface between the cabled bus and the host PCI bus;

a secondary expansion bridge for providing an interface between the cabled bus and the expansion PCI bus;

a clock generator disposed within the expansion module for generation of the expansion clock signal.

10. The modular computer system of claim 9 wherein the primary expansion bridge comprises an asynchronous PCI to PCI bridge and a demultiplexor; and the secondary expansion bridge comprises a PCI to PCI bridge and an interrupt steering unit.

11. The modular computer system of claim 9 wherein the expansion clock signal is 25 MHz.

12. The modular computer system of claim 9 wherein the cabled bus comprises a 100 conductor cable with a 100 pin connector at each end.

13. The modular computer system of claim 9 wherein the primary expansion bridge is an intelligent I/O unit.

14. The modular computer system of claim 10 wherein the primary expansion bridge further comprises:

an APIC interface unit; and the secondary expansion bridge further comprises an I/O APIC unit.

15. A method of providing modular expansion of PCI slots in a computer system comprising the steps of:

installing an expansion card in a PCI slot of a host module;

connecting the expansion card to an expansion module by a cable;

generating an expansion clock signal independent of a host clock signal;

segregating the host and expansion clock signals at the expansion card; and cabling PCI transmissions between the modules along the cable.

16. The method of claim 15 wherein the segregating step is performed by an asynchronous PCI to PCI bridge.

17. The method of claim 15 wherein the step of generating further comprises the step of coordinating arrival of the expansion clock signal at a plurality of local and remote interfaces.

18. The method of claim 15 wherein the cable is terminated and operates as a point to point PCI bus.

19. The method of claim 17 further comprising providing an APIC bus interface on the expansion card;

disposing an I/O APIC unit within the expansion module;

passing interrupts generated in the expansion module to a host APIC bus.

20. The method of claim 15 wherein an intelligent I/O unit performs the segregating step.

21. An apparatus for providing PCI slot expansion comprising:

means for segregating a host and an expansion time domain for installing in a host system PCI slot;

means for transmitting PCI signals over a predetermined distance;

means for generating a clock signal for the expansion time domain;

an expansion PCI bus responsive to the clock of the expansion time domain, said expansion bus having a plurality of PCI slots;

wherein the means for transmitting more PCI signals from the expansion bus to the means for segregating, and the means for segregating passes the signals between the time domains.

* * * * *

UNITED STATES PATENT AND TRADEMARK OFFICE
CERTIFICATE OF CORRECTION

| | | |
|---|---|---|
| PATENT NO. | : | 5,696,949 |
| DATED | : | December 9, 1997 |
| INVENTOR(S) | : | Bruce Young |

It is certified that error appears in the above-identified patent and that said Letters Patent is hereby corrected as shown below:

In column 1 at line 67 delete "requiting" and insert --requiring--

In column 6 at line 37 delete "dock" and insert --clock--

Signed and Sealed this

Eighth Day of June, 1999

*Attest:*

Q. TODD DICKINSON

*Attesting Officer*          *Acting Commissioner of Patents and Trademarks*